July 25, 1967 W. MÄHLER 3,332,365
APPARATUS FOR FORMING AND DEPOSITING DOUGH SHAPES
Filed Oct. 9, 1963
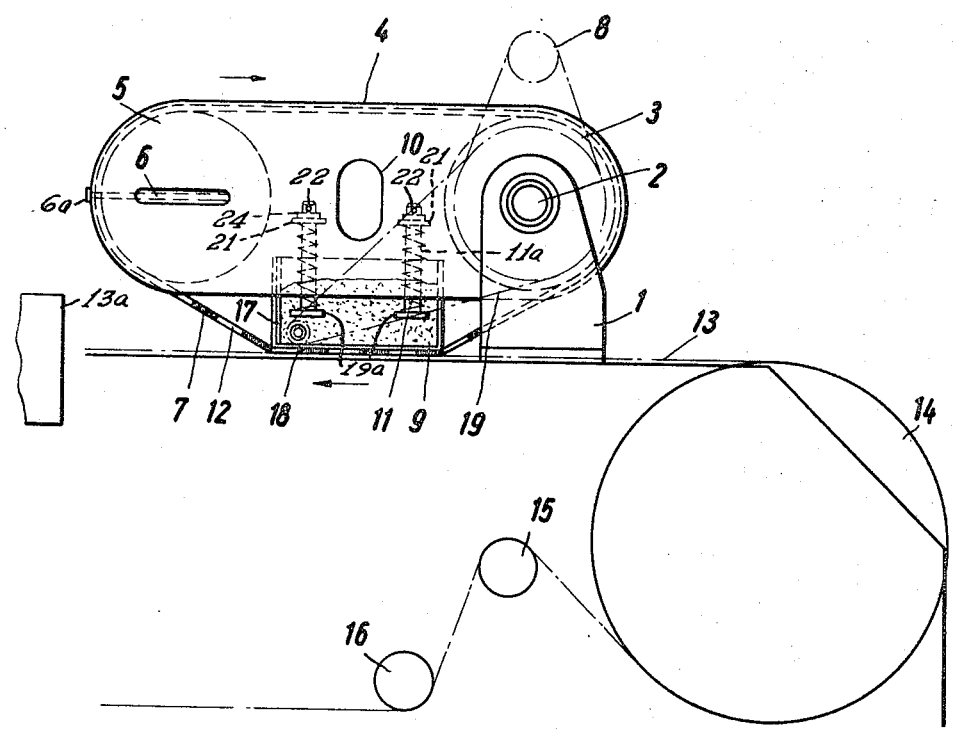
Inventor:
Willi Mähler
By Cushman, Darby & Cushman
Attorneys

United States Patent Office 3,332,365
Patented July 25, 1967

3,332,365
APPARATUS FOR FORMING AND
DEPOSITING DOUGH SHAPES
Willi Mähler, Friedrichsdorf, Taunus, Germany, assignor of forty percent to Firma Richard Neischer, Krefeld, Germany
Filed Oct. 9, 1963, Ser. No. 315,021
1 Claim. (Cl. 107—8)

The invention relates to an apparatus for forming and depositing dough shapes, preferably from flowable and spreadable doughs and like masses, by means of a template, stencil or like device. In the manufacture of a batch of baked shapes from these masses by the procedure hitherto adopted, they were pressed into depressions in the baking sheets or finished on sheets. The masses have been spread onto metal sheets by moulds. These methods are complicated and require a great deal of manual work.

The aim of the invention is to effect the shaping and deposition fully automatically and to feed the deposited shapes immediately and continuously to the baking oven, which may operate by the continuous flow method in known manner.

The aim is achieved, according to the present invention, by means of apparatus comprising a flexible band arranged to travel over rollers and having perforations which correspond to the dough shapes to be produced, and a doughbox between the upper and lower reaches of the band and closed on its underside by the lower reach of said flexible perforated band, the band being arranged so that the section thereof located in the region of the box at any time can directly contact means for continuously feeding formed shapes to the baking oven. This means may comprise an endless steel band which travels directly from the shaping machine into and through the baking oven.

The flexible perforated band is of a thickness corresponding approximately to the height of the dough shape to be produced and it will preferably be manufactured of a plastic material, advantageously with fabric insertions which desirably strengthen the perforated band into which the shapes are stamped. Plastic materials which can be brought into contact with foodstuffs and exhibit sufficiently high mechanical properties are known per se.

At least one spreading or rubbing (insertion) knife is provided in the dough box. For doughs which contain chopped fruits or hard fragments, such as nuts or the like, it is desirable to provide at least one smoothing roller. Such a smoothing roller ensures that even dough shapes with solid constituents, such as fruit shreds or hard fragments, shall be fed to the knife satisfactorily.

The driven roller of the apparatus is mounted in a bearing block which serves as the support for a jib pivotable about the axis of the said roller. The second roller is supported by the jib and the dough box is secured to the jib. The dough box is forced against the band by springs which react against the jib.

A preferred embodiment of apparatus according to the invention is illustrated in schematic longitudinal section in the drawing. In a bearing block 1 there is mounted an axle 2 for a roller 3. A jib 4, which supports a second roller 5, is pivotable about the axis of roller 3. Each journal of the roller 5 is slidable horizontally in a longitudinal slot 6, and is adjustable to a desired position in the slot by screw 6a so that the band 7 which travels over the two rollers 3 and 5 may be tensioned as desired. The drive for the revolving band is by means of a belt transmission indicated at 8. The jib 4 carries a dough box 9 which is accessible through the aperture 10 and has a bottom outlet covered by the lower reach of said band. The dough box is supported against the jib by means of springs 11 and is forced against the band 7, which closes an open bottom of the box, the box being suspended from the jib by the spindles 11a surrounded by the springs and mounted on the jib so that the box can yield resiliently.

Fixed to each of the two external surfaces of the dough box 9 are two flat bars 19a, to which the vertical spindles 11a are secured. Two further flat bars 21 are fixed to the side walls of the jib 4 and provided with holes accommodaitng the said spindles. At their upper ends each of the four spindles has a transverse hole for the reception of a tightly fitting retaining pin 22. The dough box is now mounted between the supporting side walls of the jib as follows:

The compression springs 11 are fitted onto the vertical spindles 11a which are entered into the holes in the bars 21. The springs are compressed and each spindle fitted with a retaining washer 24 above the bars, said retaining washers being located by fitting the retaining pins 22 which thus prevent the springs from pushing the spindles out of their holes in the bars. The compression of the springs is such that the bottom surface of the dough box which is covered by the band 7 is kept in sliding contact with the flat surface of the bottom part of the band, the thrust of the springs being the equivalent of the weight of the jib tilting about its fulcrum at 2.

The band 7 is made of a plastic material and is preferably provided with a fabric insertion. Into this band, perforations corresponding to the shapes to be produced are stamped, as indicated at 12. The thickness of the band corresponds to the height of the dough shapes.

In the region of the box 9, the band 7 contacts the endless steel band 13 which is guided over rolls, some of which only viz., 14, 15 and 16 are indicated, and travels through a continuous-flow oven 13a.

At the rear edge of the dough box 9 as viewed in the direction of travel of the band 13, there is located a rubbing or spreading knife 17 adjustable in vertical and oblique position. In front of the inserting knife, there is provided a smoothing roller 18 which is driven from the roller 3 by means of a belt 19.

The principle of operation of the apparatus is as follows:

Flowable or spreadable dough is charged into the box 9 through the aperture 10. Aided by the weight of the jib 4, which can swivel in the direction of the arrow 20, the dough box 9 is pressed against the band 7 and the band 7 is caused to bear on the band 13. The bands 7 and 13 are set in motion with equal velocity. The dough which passes through the perforations 12 in the band 7 is deposited upon and adheres to the steel band 13, in a shape the outline and height of which correspond to the perforations 12. The spreading or rubbing knife 17 promotes the deposition true to shape, and the smoothing roller 18 promotes the automatic feed of the dough towards the rear edge of the dough box. This roller also has the function of pressing any fruit shreds and/or hard fragments in the dough, so that they shall not be scraped off by or accumulate on the edge of the knife.

The working tempo of the apparatus must be matched to the baking speed of the continuous flow oven. This however is readily possible.

The apparatus is particularly suitable for processing all egg biscuit dough, baiser/egg white dough, sand-pastry dough, macaroon dough and coconut macaroon dough, with or without chopped nuts or fruits, also florentine dough and similar flowable or spreadable dough.

The apparatus can also be used analogously for the manufacture of pralines, also for the manufacture of cheese masses which are required to be inserted into moulds.

What I claim is:

Apparatus for forming and depositing dough shapes, comprising a flexible band, having perforations which correspond to the dough shapes to be produced, rollers over which said band travels, said rollers causing said band to define upper and lower reaches, a dough box provided between the said upper and lower reaches of the said band and covered by the said lower reach, means resiliently supporting said dough box and means for continuously feeding the formed shapes to a baking oven, said last-mentioned means surface-contacting the underface of said band under the said box so that the walls of said perforations define the peripheries and the said means defines the bases of molds for the dough whereby dough shapes are formed in said molds and then ejected from the perforations of said band upon said last mentioned means as said perforations move upwardly from said lower reach toward said upper reach.

References Cited

UNITED STATES PATENTS

| | | | |
|---|---|---|---|
| 647,403 | 4/1900 | Harton | 118—25 |
| 1,220,845 | 3/1917 | Hitchner | 107—1 |
| 2,189,214 | 2/1940 | MacFarlane et al. | 107—27 |

FOREIGN PATENTS

| | | |
|---|---|---|
| 317,272 | 8/1929 | Great Britain. |

WALTER A. SCHEEL, *Primary Examiner.*

J. SHEA, *Assistant Examiner.*